May 1, 1934.                  J. A. WATSON                  1,956,634
                           LUBRICATING DEVICE
                          Filed Sept. 17, 1931
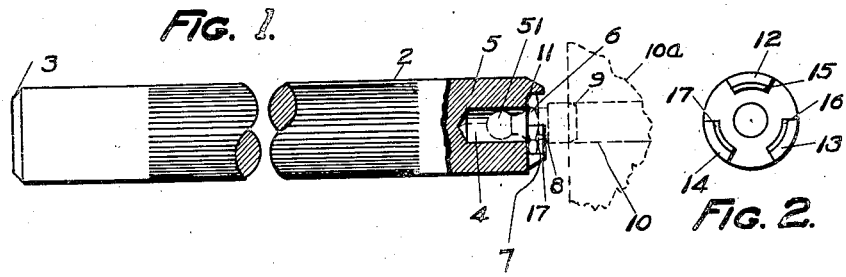
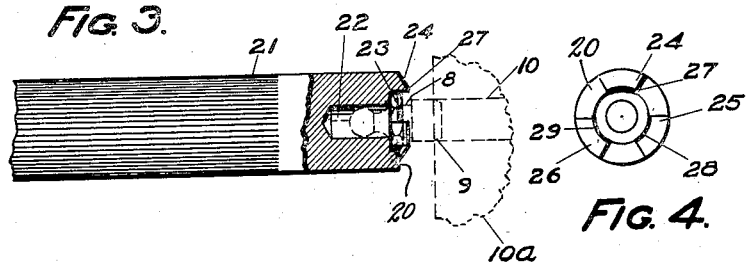
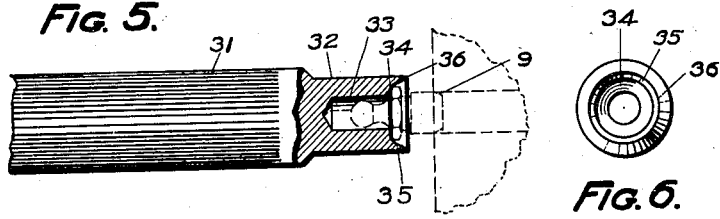
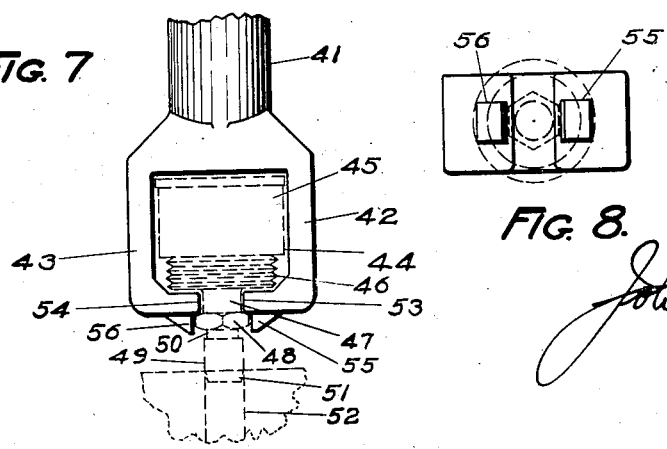
INVENTOR.
John A. Watson Patented May 1, 1934

1,956,634

UNITED STATES PATENT OFFICE 1,956,634

LUBRICATING DEVICE

John A. Watson, South Bend, Ind., assignor to The Lubrication Corporation, South Bend, Ind., a corporation of Delaware Application September 17, 1931, Serial No. 563,417

6 Claims. (Cl. 78—60)

This invention relates to tools and particularly to tools adapted to secure one article in an opening formed in another. The tools disclosed in this application are adapted to carry out the method disclosed and claimed in my copending application Serial No. 563,416 filed September 17, 1931.

In illustration of my invention I have shown several species of tools adapted to secure lubrication fittings in bores adjacent to bearings which are to be lubricated, although the invention may be used to drive and secure devices of the character disclosed and claimed in the application of A. Y. Dodge, Serial No. 563,419 filed September 17, 1931. Prior to my invention lubrication fittings of the so-called "drive" type usually have been secured by driving them into bores dimensioned so as to make a force fit. The fittings are held in the bores merely by friction with the disadvantage that high lubricant pressures cannot then be utilized because such pressures would force the fittings out from the bores. On the other hand tapped bores and threaded fittings are relatively expensive to construct and to assemble.

One of the objects of my invention is to provide a tool capable of quickly, efficiently and economically securing an article in an opening formed in another article.

A further object is to provide a tool capable of swaging, displacing, distorting or flowing metal from one article into a groove formed in another article which it is desired to attach to the first article securely to connect the articles together.

A further object of the invention is to provide a tool capable of forcing a fitting into a bore and at the same time, that is, simultaneously, capable of forcing portions of the metal adjacent to the bore into locking relationship with the fitting.

Specific features of the tool illustrated comprise a central recess into which the head of the fitting is adapted to be inserted and by which the fitting is positioned while being forced in; a drive shoulder adapted to rest upon a portion of the fitting and force it into the associated bore; and either a single continuous ring for swaging a ring of metal or one projection or a plurality of projections each adapted to swage a portion of the metal. If desired the tool may be magnetized in order that rivets, fasteners and fittings made of steel or other metal susceptible to magnetic influence may be held securely in the head of the tool while such articles are being positioned for driving, as well as during the driving operation.

Further objects will be apparent after reading the following description and claims and after considering the accompanying drawing, in which:

Fig. 1 is a fragmentary view partly in elevation and partly in section showing a drive tool constructed according to my invention, and showing, in dotted lines, a lubrication fitting and a fitting receiving member about to be connected and secured together by the tool;

Fig. 2 is a view in end elevation of the tool shown in Fig. 1;

Fig. 3 is a view similar to Fig. 1 showing a different form of tool;

Fig. 4 is a view in end elevation of the tool shown in Fig. 3;

Fig. 5 is a view similar to Fig. 3 showing a different form of tool;

Fig. 6 is a view in end elevation of the tool shown in Fig. 5;

Fig. 7 is a view in elevation showing a fragment of a tool adapted to drive a grease cup or similar fitting into a bore with which it is to be associated and showing, in dotted lines, a grease cup fitting positioned for driving; and Fig. 8 is a bottom plan view of the tool and grease cup fitting shown in Fig. 7, the cup again being shown in dotted lines.

Referring particularly to the drawing, I have shown in Fig. 1 a cylindrical drive tool 2, having a driving head 3 and provided at its opposite end with a recess 4 formed as a central bore which is adapted to receive the ball head 5 of a lubricant fitting 6. The central portion is preferably knurled to provide a hand grip. The fitting is provided with a wrench receiving portion 7 which is also adapted to serve as a shoulder by which the fitting may be driven into the bore, with an annular groove 8 into which the metal adjacent to the bore is adapted to be swaged, upset or flowed to lock the fitting in the bore, and with a sloping shoulder 9 by means of which the fitting may be easily started into the bore. In Fig. 1, the bore 10 in the metallic member 10a is shown in dotted lines, and the shoulder 9 is shown inserted in the bore. The tool may be made of hardened tool steel and may also be made a permanent magnet since it has been found preferable to make the fittings of steel and the like. The fitting may then be inserted in the bore of the tool and is there held in proper position by magnetic force. Where the tool is to be magnetized it is necessary to split the end (the recessed end) longitudinally for a distance, preferably at least past the driving seat, so that a pair of pole pieces is formed at the fitting receiving end.

Adjacent to the recess 4 and between the swaging or upsetting projections 12, 13 and 14, the tool 2 is provided with an annular drive shoulder 11 adapted to rest upon the upper side of the wrench receiving portion 7 by means of which the metal adjacent to the bore may be swaged or flowed into the annular groove 8 to lock the fitting in the bore. As may be seen, the inner sides of the projections 12, 13, and 14 have surfaces substantially parallel to the cylindrical surface of the tool and to the cylindrical surface of the cylindrical bore or recess 4, but the outer surface of the projections slope inward to the fairly blunt edges 15, 16, and 17. Moreover, the inner sides of the projections contact as shown with the outside of the wrench receiving portion 7.

In Fig. 3 is shown a drive tool 21 formed with a central recess 22, with a drive shoulder 23 and with swaging projections 24, 25, and 26. The projections 24, 25, and 26 have sharp edges 27, 28 and 29 by means of which they are adapted to shear the metal of member 10a adjacent to the bore 10 rather than swage or upset it as is the effect of the relatively blunt edges 15, 16, and 17 of the tool of Fig. 1. However, the tool may be said to effect both a shearing and a swaging or flowing operation. The inner side of each of the projections 24, 25, and 26 is substantially parallel with the line of drive of the tool and is adapted to lie closely adjacent to the outside of the wrench receiving portion 23 of the fitting. The outer surface of each of the projections slopes from the edges 27, 28, and 29 toward the outside of the tool so as to give additional strength to the projection.

In this form of the tool the projections 24, 25 and 26 arise from a shoulder or surface 20 which lies radially and longitudinally outward of the drive shoulder 23 to provide a positioning recess and steadying means for the wrench receiving portion of the fitting.

In Fig. 5 is shown a tool 31 having the fitting end thereof reduced as at 32 and provided with a bore 33, with an annular drive shoulder 34, and with an annular shearing or cutting ring 35 having a shearing or cutting edge 36. It may be noticed that the outer side surface of the ring 35 is aligned with the outer surface of the reduced portion 32 while the inner side surface of the ring 35 slopes inward to the drive shoulder 34. By reason of this slope the metal is more easily forced into the annular groove 8.

In Fig. 7 I have shown a tool 41 provided with a pair of fingers 42 and 43 adapted to embrace the upper part of a grease cup fitting 44. The grease cup comprises a cover 45, an enlarged exteriorly threaded receptacle 46, a reduced cylindrical portion 47, a wrench receiving portion 48, and a shank 49. Intermediate the wrench receiving portion 48 and the shank 49 the fitting is formed with an annular groove 50, and at the extreme shank end it is provided with a sloping shoulder by which it may be easily inserted in the bore 52. At the lower end of the fingers 42 and 43 there are formed drive projections 53 and 54 adapted to rest upon the shoulder formed by the wrench receiving portion 48 and to force the fitting into the bore 52. The drive projections 53 and 54 carry swaging projections 55 and 56 respectively by which metal adjacent to the bore 52 may be forced into the annular groove 50. This tool as well as the tool of Figs.

3 and 4 may be magnetized for the purposes previously described.

In using the tools shown in Figs. 1 to 6, inclusive, for securing fittings in bores, I may first insert the starting portion 9 of the fitting in the bore and then position the tool over the fitting in a position such as that shown in the drawing. Preferably I first insert the fitting in the positioning recess in the tool where it is held by magnetic force and then move the tool together with fitting to cause the starting portion 9 to enter the bore. One or more blows with a hammer upon the drive head of the tool causes the fitting to move into its proper position in the bore and at the same time by reason of the projections 12, 13, and 14; 24, 25, and 26; or 35; swages, distorts, displaces or flows the metal into the annular groove 8. Thus the fitting becomes locked firmly in the bore and it is impossible for it to be blown out by lubricant pressure and it is also impossible for lubricant to escape past the fitting.

Similarly, in using the tool shown in Figs. 7 and 8, I prefer to insert the fitting 44 from the side between the fingers of the tool 41, and then position the tool to cause the starting portion 51 to enter the bore 52. Driving force applied to the tool causes the fitting to move inward of the bore and the projections 55 and 56 to swage projections of metal into the groove 50 to lock the fitting in place.

The upsetting, swaging or shearing projections on the tools preferably are so proportioned that they do not contact with the metal or other similar member into which the fitting or rivet or the like is being driven until the fitting or the like has been driven partially into the bore. On the other hand, it is preferable that the projections engage the receiving member a period before the driving is completed in order that the last part of the driving operation and the swaging or distorting operation may be performed simultaneously. The reasons for and the advantages of this procedure should be apparent.

It is to be understood that the above described embodiments of the invention are for the purpose of illustration only, as various changes and modifications may be made without departing from the spirit and scope of the invention.

I claim:

1. In a tool, a body formed with a recess for receiving a portion of said article, said recess having a lateral opening so that the article may be inserted therein from the side; means for forcing the article into the bore; and means for locking the article in the bore.

2. A tool for securing a drive-type lubrication fitting in a receiving member such as a bearing comprising, a hard metal body having a recess in one end adapted to receive the fitting head, a driving shoulder extending substantially around said recess and adapted substantially to conform to a portion of the fitting for driving the same, and a projection on said tool and extending outwardly beyond said driving shoulder in the direction of the length of the tool, said projection having a face adapted to contact with the receiving member after said fitting has been driven into the receiving member to a predetermined degree.

3. A tool for securing a driven member into a receiving member comprising, a hard metal body formed with a recess in one end for reception of a portion of the driven member, a driving shoulder surrounding said recess and adapted to contact with a portion of said driven member for forcing the driven member into a hole formed in said receiving member, and a plurality of projections spaced from one another and extending longitudinally of the tool from said end at places radially outward of said driving shoulder for upsetting material of the receiving member into engagement with the driven member.

4. In a tool for securing a drive type lubrication fitting into a bore formed in a bearing, a body formed with a recess for receiving the head portion of the fitting, said recess having a lateral opening so that the fitting head may be inserted in the recess from one side, means about said recess for engaging a shoulder on the fitting for forcing the fitting into the bore of said bearing, and means adjacent to the first said means for contacting the surface of the bearing adjacent to the fitting receiving bore therein.

5. A tool for securing metal members to each other comprising, a body formed with a recess for receiving a part of one of said members, a driving shoulder positioned adjacent to said recess and rigid with said body, and a swaging projection on said body adjacent to said shoulder for swaging the metal of the other member toward the first member as the two members are forced together.

6. A tool for securing one member into a bore formed in another member comprising, a body formed with a recess for receiving a portion of the first said member, said body having a drive shoulder rigid therewith adjacent to said recess for contacting with a portion of the first said member for forcing it into said bore, and said body having a projection surrounding a portion of said shoulder and extending longitudinally of the tool from said driving shoulder for contacting with said other member after a predetermined driving of the first member.

JOHN A. WATSON.